United States Patent

[11] 3,573,618

[72] Inventor   Willian G. Dilley
               4168 N. 425 West, Ogden, Utah 84404
[21] Appl. No.  732,393
[22] Filed      May 27, 1968
[45] Patented   Apr. 6, 1971

[54] SOLID-STATE CHARACTERISTIC CURVE TRACER ATTACHMENT FOR OSCILLOSCOPES
10 Claims, 22 Drawing Figs.
[52] U.S. Cl. .................................................. 324/158,
                                                        324/121
[51] Int. Cl. ..................................................G01r 31/22,
                                                        G01r 13/20
[50] Field of Search........................................ 324/158
                                   (T), 158 (D), 113, 121

[56]            References Cited
              UNITED STATES PATENTS
3,076,140   1/1963  Smith .......................... 324/158

Primary Examiner—Rudolph V. Rolinec
Assistant Examiner—Ernest F. Karlsen
Attorneys—Mallinckrodt and Mallinckrodt, P. H. Mallinckrodt, Philip A. Mallinckrodt and David V. Trask ABSTRACT: An all solid-state attachment unit for various types of standard oscilloscopes to enable them to perform the functions of a characteristic curve tracer for solid-state devices. The attachment may be modular, constructed as a plug-in unit for certain types of standard oscilloscopes so as to make use of available power, electronic capability, and display contained within such oscilloscopes, or it may be similar but containing a plug-in facility for a power supply auxiliary to those contained within the oscilloscope, so it can be used with certain other types of standard oscilloscopes not providing all the required power supplies, or it may be a completely separate console adapted for plug-in connection with a power source and with the vertical and horizontal amplifier inputs, respectively, of various other types of standard oscilloscopes that are not constructed to receive plug-in units. When connected with a standard oscilloscope, the attachment unit of the invention in effect constitutes an integral part of the oscilloscope and provides augmented capability therefor, so as to make possible the visual display of characteristics of solid-state devices undergoing test.

FIG. I.

INVENTOR.
WILLIAM G. DILLEY
BY
ATTORNEYS

Patented April 6, 1971

$H_{FE} = \dfrac{I_{C1}}{I_{B1}}$

INVENTOR.
WILLIAM G. DILLEY
BY
*Mallinckrodt and Mallinckrodt*
ATTORNEYS

Patented April 6, 1971

INVENTOR.
WILLIAM G. DILLEY

BY

*Mallinckrodt*
*Mallinckrodt*

ATTORNEYS

Patented April 6, 1971

INVENTOR.
WILLIAM G. DILLEY

BY *Mallinckrodt and Mallinckrodt*

ATTORNEYS

SOLID-STATE CHARACTERISTIC CURVE TRACER ATTACHMENT FOR OSCILLOSCOPES

BACKGROUND OF THE INVENTION

1. Field of the Invention

This invention relates to electronic test equipment generally known as "curve tracers" useful in research, design, and education for generating and displaying families of characteristic curves of various solid state devices, such as transistors, field effect transistors, diodes, etc., under varying conditions of polarity, load, and voltage, or single characteristic curves or portions thereof.

2. State of the Art

Heretofore, characteristic curve tracers have been available only as complete units of equipment of considerable size and cost. Utilization of standard oscilloscope capability for producing characteristic curves of electronic devices has been impractical. This has been true because of the high costs and large bulk involved to achieve the desired additional capability.

SUMMARY OF THE INVENTION

In accordance with the invention, solid state electronic circuitry is utilized to provide curve tracing capability for existing oscilloscopes. Unique power supply circuitry and polarity switching circuitry for items under test permit outstanding cost and size reduction.

The power supply circuitry does not employ a bulky and expensive autotransformer as voltage control means in accordance with conventional practice, but utilizes a compact and inexpensive electronic voltage regulator and control. This is possible as a practical matter because the unique switching circuitry within such power supply circuitry provides full voltage for display purposes but considerably reduces the power dissipation requirements of the voltage control means by effecting a voltage split.

The polarity switching circuitry to accommodate both NPN and PNP transistors involves a system grounding arrangement whereby one terminal of the test station always remains at ground potential, irrespective of polarity mode or voltage range, and polarity reversal is accomplished by switch means in the power supply circuitry. The one terminal of the test station is the ground plane (voltage potential reference) for the complete system.

There is preferably included a step generator having a differential amplifier supplied with positive feedback to generate a square wave form whose wave front is coincident with the zero points of the incoming sine wave.

The step generator circuitry insures stability and repeatability, without requiring sophisticated precision circuitry. Thus, a differential amplifier with positive feedback is utilized to generate a square wave form having a wave front coincident with the zero points of the incoming sine wave.

It should be noted that the voltage is linear and can be read directly from an appropriately graduated dial, rather than requiring comparison with preestablished curves.

THE DRAWINGS

Shown in the accompanying drawings are specific attachment units presently regarded as the best modes of carrying out the invention with respect to various types of standard oscilloscopes.

In the drawings.

DETAILED DESCRIPTION OF THE ILLUSTRATED EMBODIMENTS

Figure 1:
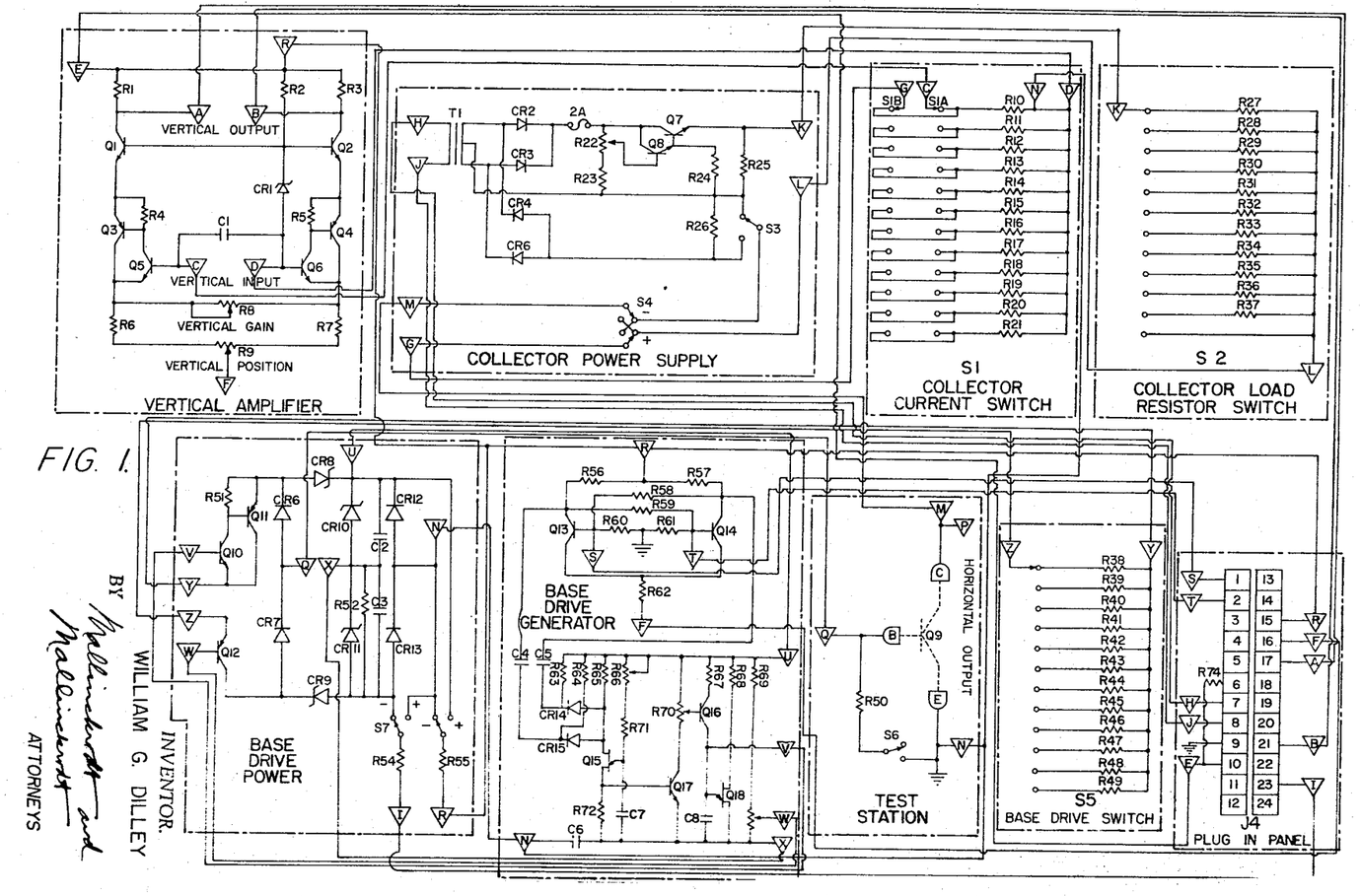
FIG. 1 is a circuit wiring diagram for an attachment unit designed for use with a current Model 561A, 564, or 565 "Tektronix" oscilloscope as a plug-in unit which converts such an oscilloscope to a characteristic curve tracer for solid-state devices primarily, the several component circuits of the unit being individually segregated by broken lines.

The detailed circuitry of FIG. 1 is merely illustrative of the invention in a preferred form applicable to a particular type of widely used and commercially available make of oscilloscope constructed to receive various plug-in units for different uses of the oscilloscope. As previously indicated, heretofore there has never been a plug-in unit capable of adapting the oscilloscope for use as a characteristic curve tracer.

As an aid in tracing through interconnections between component circuits, interconnected circuits are designated by the same letter within a triangle; also, plug-in connections provided for plugging into the standard plug-in connections of the oscilloscope are indicated in the usual manner. Thus, a diagram indicative of the plug-in panel of the oscilloscope shows customary plug-in connections numbered 1 to 24, only some of which are actually utilized by the curve tracer plug-in unit of the invention.

Figures 2, 3:
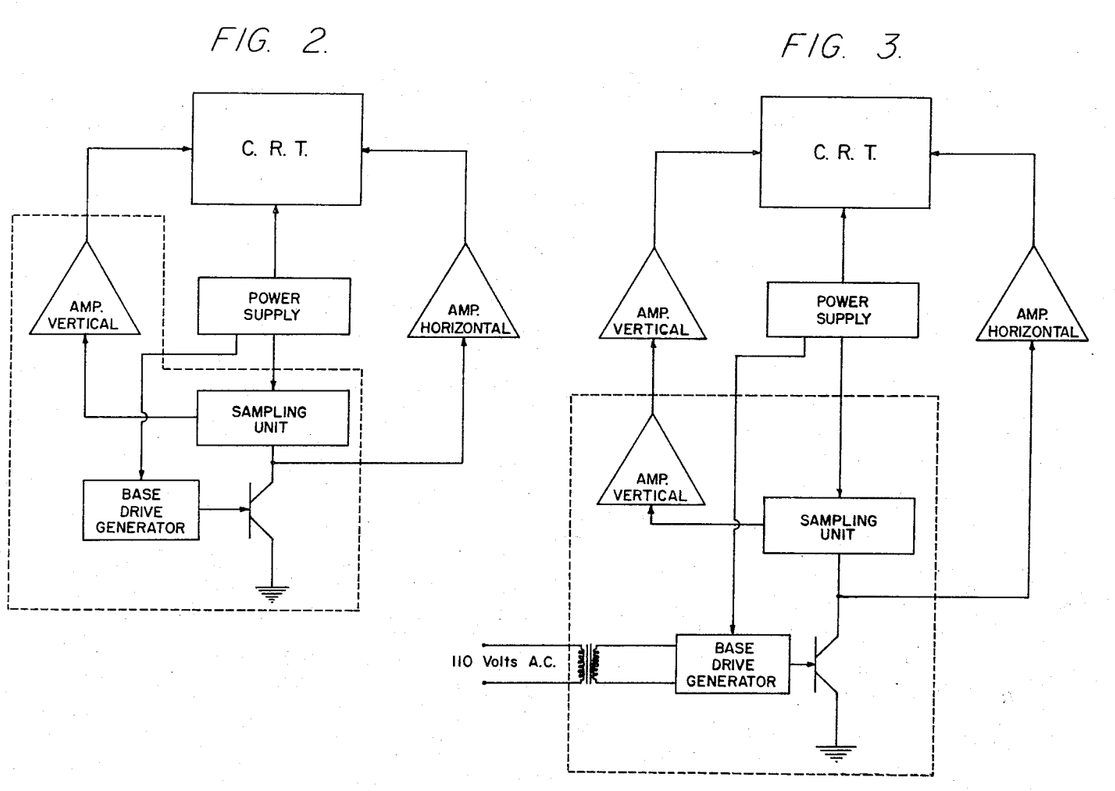
FIG. 2, a block diagram of the system of FIG. 1, the portion constituting the attachment unit being enclosed by broken lines.
FIG. 3, a corresponding block diagram of a similar plug-in unit designed for use with other models of "Tektronix" oscilloscopes that do not have plug-in terminals for the 110 v. power supply necessary to power the base drive generator and collector power supply provided by the unit.
Figure 4:
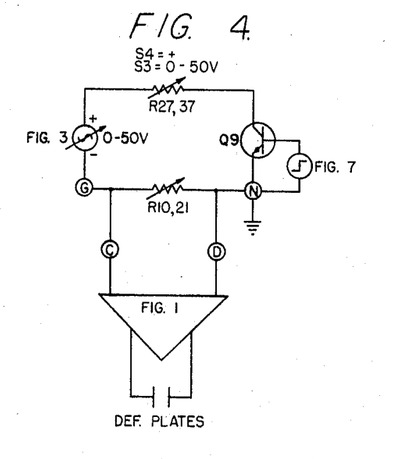
FIGS. 4 through 7, equivalent circuit diagrams showing various circuit arrangements with respect to grounding under conditions of voltage and polarity switching of the collector power supply.
Figure 5:
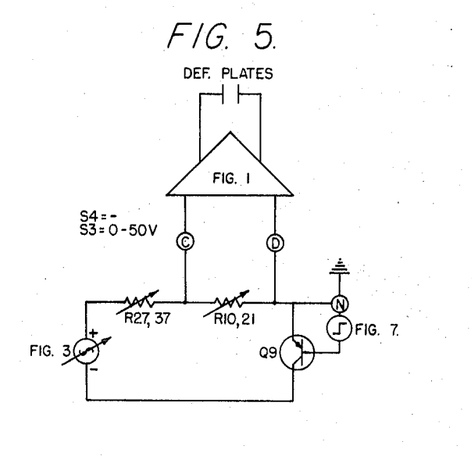
Figure 6:
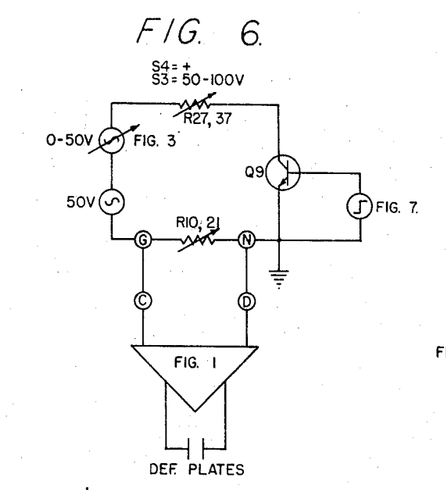
Figure 7:
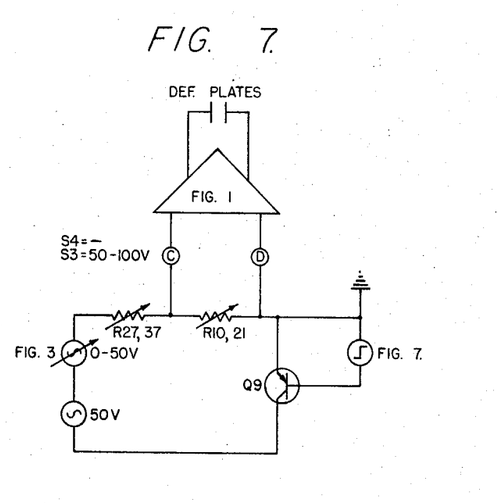

The simplified block diagram of FIG. 2 illustrates the circuitry of FIG. 1 from the standpoint of the functions of the respective component circuits in the total system.

Figure 13:
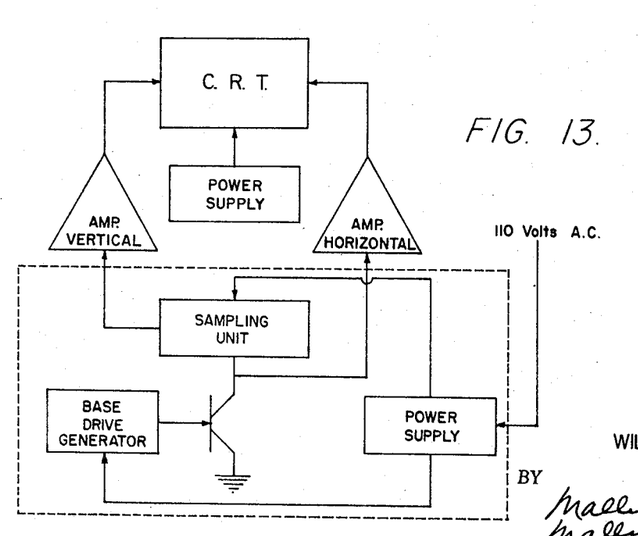
FIG. 13, a block diagram similar to those of FIGS. 2 and 3, but representing a system designed for use as a separate console with oscilloscopes not constructed to receive plug-in units.

The block diagrams of FIGS. 3 and 13 are illustrative of systems adapted for other types of commercially available oscilloscopes. Thus, while FIGS. 1 and 2 apply to current plug-in Models 561A, 564, and 565 "Tektronix" oscilloscopes, and FIG. 3 to current plug-in Models 531A, 533A, 535A, 536A, 534B, 544, 545B, 546, 547, 549, 551, 555, and 556 "Tektronix" oscilloscopes, FIG. 13 applies to other oscilloscopes of various makes that are not of plug-in type but that are provided with both vertical and horizontal inputs.

The vertical amplifier of the plug-in unit of the invention, which replaces the one removed from the oscilloscope to make room for such plug-in unit, see FIGS. 1 and 2, or a matching one optionally and additionally supplied with the plug-in unit of the invention to give extra sensitivity, see FIG. 3, or the one built into the oscilloscopes, see FIG. 13, provides both bias voltage and signal gain necessary to convert the current flowing through, for example, a transistor under test, see Q9, FIG. 1, into a form which will drive the vertical deflection plates of the oscilloscope.

This conversion is accomplished with a sampling unit, see FIGS. 2, 3, and 13, which converts the current into voltage which can be amplified. With particular reference to the detailed circuitry of FIG. 1, the resistor which performs this conversion is selected from those shown in the collector current switch, S1, as R10 through R21. By switching various resistors, the current range which can be measured by the plug-in unit can be varied within limits determined only by the value of the resistors.

Terminal N, FIG. 1, is grounded via terminal E of the test station, and, in the instance of the transistor Q9 having its emitter connected to terminal E of the test station, this provides a return path for the collector current of such transistor Q9 through the selected sampling resistor (R10 to R21) and out terminal G to the collector power supply. The sampling voltage, which is proportional to this current, appears across input terminals C and D of the vertical amplifier. By using two separate poles of the collector current switch S1, the voltage drop across the contacts due to the collector current of Q9 is not added to the voltage across the sampling resistor.

The voltage which appears across terminals C and D is the input to the matching vertical amplifier of the plug-in unit. As shown, this amplifier includes a differential amplifier comprising transistors Q5 and Q6. Capacitor C1 filters out any high frequency signals and noise which would deteriorate the quality of the output signal with unnecessary noise. Transistors Q3 and Q4 provide a negative feedback into Q5 and Q6, respectively, which gives the differential amplifier a very high input impedance, and allows a low emitter resistance to be used and still obtain a current source output with very linear and stable DC operation.

Since the emitters of Q5 and Q6 are at essentially the same voltage, resistance R8 can be varied to provide a fine gain adjustment without upsetting the biasing of the amplifier.

Q1 and Q2 are grounded base transistors of a very high voltage type, which drive the vertical deflection plates of the C.R.T. connected to terminals A and B. Q1 and Q2 are biased above ground with Zener diode CR1 to provide operating voltage for the differential amplifier (Q5, Q6, Q3, Q4), which drives them via the emitters. Power for the entire circuit is provided at terminals E and F, which are typically +300 volts and −12.2 volts, respectively. A positive voltage at terminal R, in conjunction with R2, provides a bias current for CR1.

Since the current through load resistors R1 and R3, and thus the voltage across the deflection plates, is determined by the resistance in the emitters of Q5 and Q6, the position of the vertical trace is adjusted by varying this resistance via R9. With this method of adjusting the vertical position, only one potentiometer is required and there is no need for biasing the input above ground, which would upset the operation of the rest of the unit.

The collector power supply is unique in that it replaces a very bulky, heavy, and expensive autotransformer required by conventional circuitry. For example, the output is essentially the same as that of an autotransformer, e.g. "Variac," with a four ampere capability. The continuous average current rating of the power supply is only two amperes, but, due to the characteristics of the current in the collector terminal of the test station, the peak current can go as high as four amperes without going over two amperes average.

This power supply is also unique in that, instead of varying the voltage continuously from 0 to a maximum voltage, e.g. 100 volts, it does it in a plurality of steps, e.g. two, 0 to 50 to 100. This circuitry requires less power dissipation in the series regulator, which here takes the form of a cascaded emitter follower comprising transistors Q7 and Q8. Without this circuitry, for full swing, the transistor Q7 would have to be capable of twice the power dissipation, e.g. 160 watts. By switching in steps, e.g. 50 volt steps, the maximum is only half the power (e.g. 80 watts) required by normal methods and circuitry.

The switching is accomplished by means of a switch S3 in the collector power supply. The low side of the output from the center tap of the transformer T1 is switched to an equal voltage negative power supply CR4 and CR5 (e.g. −50 volts). This applies a constant voltage to the load, and the regulator adds voltage (e.g. 0 to 50 volts) to that of the load.

The regulator itself contains no capacitor, so the output follows the fullwave rectified input. (The input is a constant fullwave rectified DC signal from T1 and CR2+CR3). This voltage is divided with potentiometer R22+R23, whose control knob of usual type (not shown) appears on the front panel of the unit for manual manipulation. The low power, variable voltage signal is fed to Q8, and in turn to Q7, which amplifies it to a high current capability signal. Since Q7 and Q8 are in the emitter follower configuration, they have a very low output impedance and the voltage is relatively unaffected by the load. With the usual power source, a 60 cycle, fullwave, rectified, variable voltage source is the result. R23 performs the function of biasing the input signal up to compensate for the VBE on Q7+Q8, so the output starts at the beginning of the potentiometer and not a quarter turn from the starting position. R24, R25, R26 all perform the function of insuring that the output goes to zero between each cycle.

Since the ground is external to the collector power supply portion of FIG. 1, switch S4 can be used to reverse the polarity appearing across the test transistor.

Terminals K and L tie to switch S2. This is an adjustable series resistor (R27−R37) in the collector of Q9. It performs the function of limiting the power in both the collector terminal of the test station, and the series regulator Q7, as well as providing a visible load line on the characteristic display of Q9 when the device being tested is a transistor or the like.

The overall operation of the circuits described are shown more clearly by the series of equivalent circuits of FIGS. 4—7. These equivalent circuits indicate a concept that is of primary importance to the operation of the unit. The emitter terminal of the test station, the current sampling resistor, and the vertical amplifier are, at all times, tied to the same common ground point. This circuit arrangement insures that, in the instance of the transistor Q9 and of similar devices being tested, the base drive current is not added to nor displayed as part of the collector current.

The horizontal amplifier of the oscilloscope (not shown), which displays the voltage across the collector of Q9, is also connected to this same ground point, for example the main frame of the oscilloscope, and cannot be disconnected. Therefore, in the illustrated instance, in order to display the true collector to emitter voltage, the emitter of Q9 must be grounded. This circuit arrangement also allows the current and voltage of Q9, regardless of the type, to be displayed in the correct polarity without additional switching.

Accomplishing all of these requirements simultaneously, is made possible by the unique combination of switching circuitry utilized in FIG. 1 and explained by these equivalent circuits of FIGS. 4—7.

The base drive generator generates the staircase wave form necessary to obtain a family of curves for display. In order to explain its operation, the operation of a conventional curve tracer must first be understood. For this reason, a brief explanation of the basic theory is given.

Figure 8:
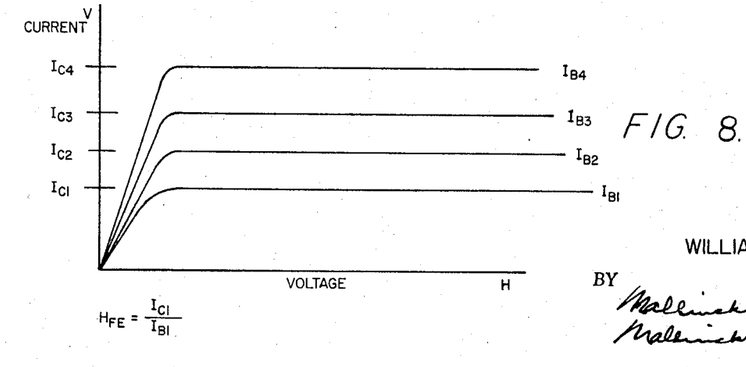
FIG. 8, a family of typical characteristic curves of a test transistor as depicted by the curve tracer of the invention.

A typical family of curves, as shown in FIG. 8, is obtainable by sweeping the collector with a full wave rectified 60 Hz. signal, while at the same time applying a constant current to the base of the transistor under test.

Figure 9:
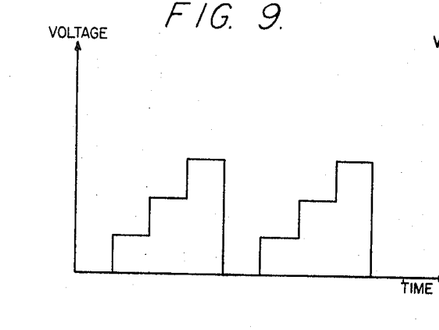
FIG. 9, a representation of a typical staircase wave form produced by the step generator.

The horizontal signal represents the voltage between the collector and emitter, and the vertical signal represents the collector current for a given base current. Since the gain of the transistor is given in terms of current, the unit must measure in terms of current in order to be meaningful. In order to measure the transistor gains, the collector current as well as the base current must be known. The method of measuring the collector current has already been described, and the base current is known because the base generator can be set accurately for any current, here by selecting a proper resistor in the base drive switch of FIG. 1. Since the gain of a transistor varies with current, it is desirable to be able to display and measure this variation. For this reason, a family of curves is displayed instead of just a single curve. This allows the variation to be seen and measured at as many different points as there are base current steps. The base steps are generated by forming a staircase waveform, and by converting it to a current which is fed to the base of the transistor. The waveform, indicated in FIG. 9 is generated by the circuitry of the base drive generator shown in FIG. 1, which is merely one form of circuitry for this purpose, and, here, is converted to a current by the unique base drive power circuitry of FIG. 1.

For the display to be seen, the waveform must be in synchronization with the line frequency which is sweeping the collector. If the waveform is not in perfect synchronization, a distracting line will appear across the trace on the C.R.T. each time the base drive generator steps to a new current. Also, if the generator steps once each cycle of the line frequency, the total trace will take 1/15 of a second (with 60 cycle power) to be completed, and will cause a distracting flicker.

Figure 10:
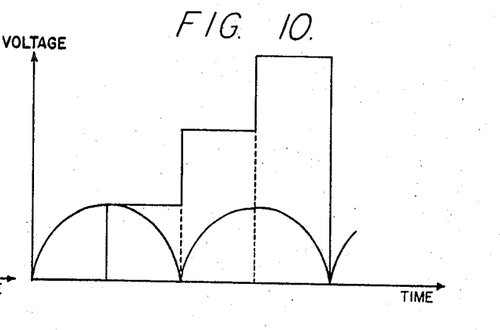
FIG. 10, a superimposition of a sine wave on the collector voltage in a typical instance of operation of the system of the invention.

These problems are overcome by generating a staircase waveform of four times the line frequency (to eliminate the flicker) that is exactly in synchronization with the line (to eliminate a distracting line across the trace). A synchronized signal, shown in FIG. 10, is superimposed on the collector voltage. The combination of signals results in a trace, shown in FIG. 11. Since the step is very rapid, those portions at the ends of the trace are almost invisible, and the beginning of the trace is completely covered by the zero point.

In the present instance, obtaining a synchronized staircase voltage which is four times the line frequency is the special function of the base drive generator circuit of FIG. 1. The line frequency synchronizing pulse is generated by the high gain, positive feedback, differential amplifier formed by Q13 and Q14. The positive feedback, accomplished by R58 and R59, turns the differential amplifier into a square wave generator. This square wave is derived from the 6.3 v. AC signal obtained from a filament transformer in the main frame via terminals S and T. Since the amplifier changes state only when the input is at zero, a pulse is generated each time the line voltage goes to zero. This insures that the base step will occur only when the collector voltage is also at zero. This square wave is fed through capacitor C4 and C5, and, in conjunction with R63 and R64, differentiates and forms very narrow pulses—one at the positive crossover voltage and one at the negative crossover voltage. Diodes D14 and D15 eliminate the positive pulses and allow only the negative pulses to be applied to R65.

Q15 operates as a free running pulse generator of approximately four times the line frequency, the frequency being determined by C7, R71, and R66. This frequency is adjusted to slightly greater than the line frequency multiple, so that the incoming pulses occur before the unijunction Q15 would normally fire. The negative pulse going into R65 lowers the firing voltage, and causes a pulse to be generated at the output at exactly the time the line voltage goes to zero. Since the frequency is four times that of the line, a synchronization pulse occurs only at every other pulse output. This unsynchronized pulse is the one that causes a step at the peak of the collector voltage, and since this is a very flat, broad voltage peak, the exact time of occurrence is not critical.

This pulse generated by Q15 is fed to Q17, an amplifier that squares the pulse. R72 insures that Q17 turns "on" and "off" rapidly and remains "off" between pulses. The amplitude of this square pulse is adjusted by R70 before it is fed to Q16, which is a voltage to current converter. This square current pulse from Q16 is applied to C8 to form the staircase voltage, appearing at terminal V. Assuming no load on C8, the voltage on it remains constant as long as Q16 is turned off. When the pulse is applied to Q16, a current determined by R70 and R67 flows into C8, causing the voltage to rise at a constant rate, until the pulse ends and the voltage on C8 again remains constant.

As long as the incoming pulse is the same each time, the amount of increase in voltage on C8 will always be the same. This voltage will continue to rise in steps as described, until the breakdown voltage of Q18 is reached. At this point, it will fire and discharge C8 to some low voltage, so that the process can be repeated for the next cycle. The pulse amplitude is adjusted for the required number of steps to occur just before the breakdown voltage of Q18, and thus, when the next step occurs, the breakdown is reached before the pulse ends and the capacitor is discharged at the very instant of zero voltage on the collector. Since the voltage on C8 is not completely discharged, a bias voltage is supplied by R69 and R73 to compensate for it. This voltage which appears on terminal W is adjustable by R73 and serves the function of biasing the first step at exactly zero. C6 is a bypass capacitor to furnish an AC ground for the circuit, which is biased at other than ground at all times.

The power for this circuit is supplied through terminals R, F, U, and X. R and F are derived directly from power in the oscilloscope main frame. U and X are derived from Zener diode D10 in the base drive power circuit.

This base drive power circuit performs two distinct functions. It supplies power to the base drive unit, and it takes the staircase voltage generated in the base generator and converts it to either a positive or negative current of a precise variable value depending upon S7 and S5, respectively.

Figure 12:
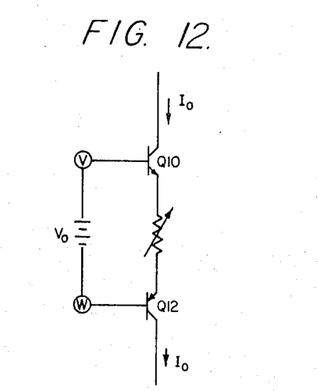
FIG. 12, a schematic diagram of the basic power source in the base drive circuit of FIG. 1.

The basic current source in the base drive power circuit of FIG. 1 is shown in FIG. 12 and comprises a voltage reference $V_o$ (which is, in actuality, the staircase voltage output from the base generator) applied to complimentary emitter followers, which, in turn, apply it to a reference resistor selected from the resistors R38 to R49 supplied by the base drive switch S5. This combination determines a current $I_o$, which flows both in and out of the circuit. By biasing this circuit above or below the base terminal of the test station, a current can be made to flow in either the positive or negative direction depending on the bias. The advantage of this circuitry is that only one reference resistor is needed and no complex switching is required.

Since the reference voltage $V_o$ is, in practice, a small capacitor C8, which, if the input impedance is low, would change its voltage when a load is applied, the input impedance of this configuration must be very high. To accomplish the necessary increase in impedance, transistor Q11 is added, without affecting the basic operation in any way. The remainder of the circuitry in the base drive power circuit accomplishes the function of biasing this current source above or below the test station, depending on the position of S7. Terminals I and R are supplied with a very high negative and positive voltage, respectively, from the main frame of the oscilloscope, which, in turn, supplies power to the entire base drive circuitry. R53 is a loading resistor to keep from unloading the power supplies when in the "off" position.

Diodes D10 and D11, in conjunction with C2 and C3, form two power supplies in series, which provide biasing for the current source as well as power for the base drive generator. Resistor R52 bypasses the base drive generator current around D11 to prevent overheating it.

When the switch S7 governing base polarity is in the positive direction, current flows through R55 to the positive side of D10, through D10, through D11, and out D13 to ground. D12 is reverse biased in this state. This forms two positive power supplies in series, whose values are that of the reference voltage of D10 and D11. The entire base drive generator is above ground by the value of D11, since its high side is tied to the low side of the generator. Also, since the current source is referred to the generator, it is above ground by this value. Therefore, D6 and D9 are reverse biased, and current flows through D8 to the current source and out D7 to the base terminal of the test station via terminal Q. Diode D9 remains reverse biased, with no current flow, as long as the output voltage is less than its breakdown value.

When S7 is placed in the negative position, current flows from ground through D12, D10, D11, and out R54 to the negative supply. This forms two series power supplies, which are biased negatively with respect to ground, and place the base generator and the current source below ground by the value of D10. The reference current now flows out the test transistor Q9 through D6 to the current source and out D9 to the power supply. D7, D8 and D13 are all now back-biased. Again, D8 remains reverse-biased, with no current flow, only as long as the negative output voltage across Q9 remains less than the breakdown of D8.

In the test station, terminals are provided, as indicated by E, B, and C, for connection to the external test item, e.g. transistor Q9. The circuitry includes a switch S6 which connects R50 across the base drive output terminals. This resistor is used for calibrating the base generator and as a voltage source output for high impedance loads, such as field effect transistors.

Figure 11:
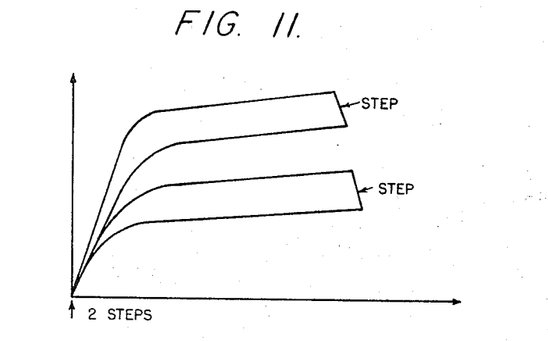
FIG. 11, a simulated trace of the combination shown in FIG. 10.

Although the test terminals are indicated E, B, and C to represent emitter, base and collector, respectively, it should be understood that this merely orients the test station in terms of one possible testing procedure wherein an external test transistor or the like, e.g. Q9, is connected correspondingly, i.e. for testing in the grounded emitter configuration. If it is desired to test such transistor or the like in the grounded base configuration, or in a variety of other configurations, the connections between the test item and the test station are appropriately interchanged and appropriate changes are made on the front-panel controls of the plug-in unit of the invention and of the oscilloscope with which it is used, all as will be apparent to those skilled in the art. Resulting families of characteristic curves from the most important of such possible configurations are shown in FIGS. 14—23, respectively, it being understood that the family of curves resulting from the most common configuration, i.e. grounded emitter, is shown by FIGS. 8 and 11 considering the test transistor Q9 to be a NPN.

Figure 14:
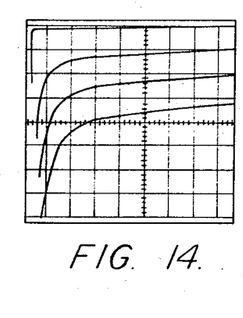
FIGS. 14—22, families of characteristic curves, respectively, obtainable by testing various other items in other configurations than for FIGS. 8 and 11.
Figure 15:
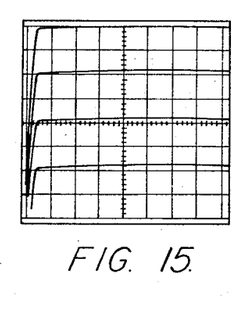
Figure 16:
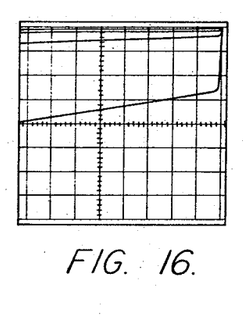
Figure 17:
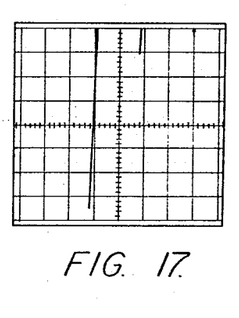
Figure 18:
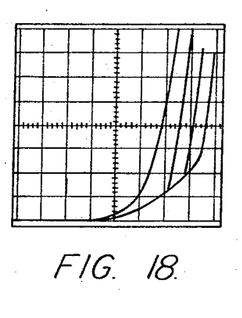
Figure 19:
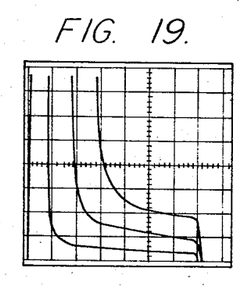
Figure 20:
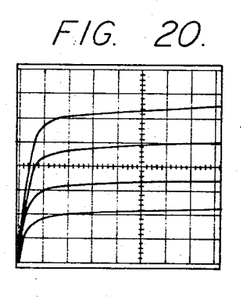
Figure 21:
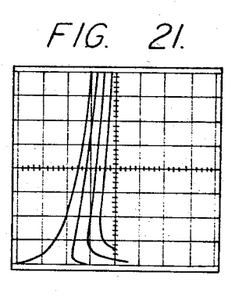
Figure 22:
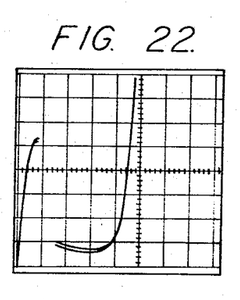

With respect to FIGS. 14—22, the curves shown in FIG. 14 are for a PNP grounded emitter, those in FIG. 15 are for a PNP grounded base, those in FIG. 16 are for a PNP grounded emitter with base voltage drive, those in FIG. 17 are for a PNP grounded emitter with base voltage versus collector current displayed, those in FIG. 18 are for a NPN grounded emitter with base voltage versus base current displayed, those in FIG. 19 are for a NPN grounded emitter with base current versus collector voltage displayed under saturated conditions, those in FIG. 20 are for a FET N channel with grounded source, those in FIG. 21 for a UJT emitter with grounded B2, and those in FIG. 22 for a tunnel diode.

Although detailed circuits are shown only for the plug-in unit represented by the block diagram of FIG. 2, those for the attachment units of the invention represented by the block diagrams of FIGS. 3 and 13 are essentially identical it being realized that for the unit of FIG. 3 the particular oscilloscopes concerned require a vertical amplifier of a simpler type than shown in FIG. 1 and the addition of a transformer for supplying 6.3 v. AC to terminals S and T of the base drive generator, and that for the unit of FIG. 13 no vertical amplifier is required and a complete set of power supplies is required.

When the transformer T1 is one that operates on 50 or 60 cycles, the attachment unit of the invention can be used on either a 50 or a 60 cycle power source.

In the specific form illustrated in FIG. 1, the means for supplying power to the staircase waveform generating means also constitutes the polarity selecting means of the means that supplies power for the staircase waveform applying means, and, furthermore, in such instance, also constitutes the power supply for the staircase waveform applying means. Nonetheless, it should be realized that both such polarity selecting means and such power supply for the staircase waveform applying means can be provided in forms independent of the means for supplying power to the staircase waveform generating means, within the normal skill of the art.

Whereas this invention is here illustrated and specifically described with respect to the details of a preferred form thereof, it should be understood that other structural details may be employed without departing from the inventive subject matter particularly pointed out by the claims which here follow.

I claim:

1. A solid-state, characteristic curve tracer attachment for oscilloscopes, comprising:

means for generating a staircase waveform, said means including an isolation transformer for stepping down line voltage to a relatively low voltage sine wave, a differential amplifier having positive feedback for converting the low voltage sine wave to a square wave, a differentiator for converting the square wave to a pulse train, and means for converting said pulse train to a staircase waveform;

means for applying said waveform to a test device to produce a resultant waveform;

means for converting said resultant waveform to horizontal and vertical waveforms suitable for feeding to the horizontal and vertical terminals, respectively, of an oscilloscope;

respective means for feeding said horizontal and vertical waveforms to the horizontal and vertical terminals, respectively, of an oscilloscope;

means for supplying power to said test device; n means for $b$, power to Jstaircase waveform generating means; and means, including polarity selecting means, for supplying power to the staircase waveform applying means.

2. An attachment for oscilloscopes Jrecited in claim 1, wherein: K81 the means for applying the staircase waveform to the test device comprises a pair of complementary emitter followers connected in series, means supplying a plurality of resistors for selective connection with said followers to produce a current output, and means for connecting said current output to the test device in appropriate polarity; and wherein the polarity selecting means of the means for supplying power to the staircase waveform applying means is a multiple-acting electronic switch.

3. An attachment for oscilloscopes as recited in claim 1, wherein the means for converting the resultant waveform to horizontal and vertical waveforms comprises means supplying a plurality of resistors for selectively connecting the power supplying means for the test device to said test device and to the vertical waveform feeding means.

4. An attachment for oscilloscopes as recited in claim 1, wherein the means for feeding the vertical waveform to the vertical terminal of an oscilloscope includes a vertical amplifier.

5. An attachment for oscilloscopes as recited in claim 1, wherein the means for supplying power to the test device, comprises a pair of DC power supplies, electronic means for controlling one of said DC power supplies, and means for adding the other of said DC power supplies to the electronically controlled power supply.

6. An attachment for oscilloscopes as recited in claim 5, wherein the electronic controlling means comprises a cascaded emitter follower, and voltage adjusting means arranged to drive said emitter follower.

7. An attachment for oscilloscopes as recited in claim 1, wherein the means for supplying power to the staircase waveform generating means also constitutes the polarity selecting means of the power supplying means for the staircase waveform applying means.

8. An attachment for oscilloscopes as recited in claim 1, wherein the means for supplying power to the staircase waveform generating means also constitutes the power supply for the staircase waveform applying means.

9. An attachment for oscilloscopes as recited in claim 8, wherein the means for supplying power to the staircase waveform generating means comprises a static DC power supply including Zener diode means arranged to regulate and to switch the applied DC voltage.

10. An attachment for oscilloscopes as recited in claim 1, wherein the several components are mounted within a supporting structure constructed to be plugged into a plug-in type of oscilloscope.

PO-1050
(5/69)

UNITED STATES PATENT OFFICE
CERTIFICATE OF CORRECTION

Patent No. 3,573,618                    Dated  April 6, 1971

Inventor(s)  William G. Dilley

It is certified that error appears in the above-identified patent and that said Letters Patent are hereby corrected as shown below:

Column 8, line 18, delete "n" at the end of the line;

line 19, change "b," to --supplying--, and "Jstaircase" to

--the staircase--; line 23, change "Jrecited" to --as recited-- and line 24, delete "K81".

Signed and sealed this 2nd day of November 1971.

(SEAL)
Attest:

EDWARD M. FLETCHER, JR.            ROBERT GOTTSCHALK
Attesting Officer                  Acting Commissioner of Paten